United States Patent
Matsumoto et al.

(10) Patent No.: US 12,231,754 B2
(45) Date of Patent: Feb. 18, 2025

(54) IMAGING MODULE WITH A CASE HAVING A LIGHT TRANSMISSIVE MEMBER

(71) Applicant: Panasonic Intellectual Property Management Co., Ltd., Osaka (JP)

(72) Inventors: Yasutaka Matsumoto, Tokyo (JP); Masayuki Yoshie, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 70 days.

(21) Appl. No.: 17/986,669

(22) Filed: Nov. 14, 2022

(65) Prior Publication Data

US 2023/0283871 A1    Sep. 7, 2023

(30) Foreign Application Priority Data

Mar. 3, 2022    (JP) ................................ 2022-032954

(51) Int. Cl.
  *H04N 23/54*    (2023.01)
  *B23K 26/21*    (2014.01)
  *H04N 23/51*    (2023.01)

(52) U.S. Cl.
  CPC ............. *H04N 23/54* (2023.01); *B23K 26/21* (2015.10); *H04N 23/51* (2023.01)

(58) Field of Classification Search
  CPC ........ H04N 23/54; H04N 23/51; H04N 23/52; H04N 23/55; H04N 23/57; B23K 26/21
  See application file for complete search history.

(56) References Cited

U.S. PATENT DOCUMENTS

| | | | |
|---|---|---|---|
| 5,893,959 | A | 4/1999 | Muellich |
| 7,965,336 | B2 | 6/2011 | Bingle et al. |
| 8,792,003 | B2 | 7/2014 | Nakamura |
| 2022/0070344 | A1 | 3/2022 | Matsumoto et al. |
| 2023/0054092 | A1* | 2/2023 | Yamashita ............. H04N 23/57 |

FOREIGN PATENT DOCUMENTS

| | | |
|---|---|---|
| JP | 2006184464 A | 7/2006 |
| JP | 2011164461 A | 8/2011 |
| JP | 5129352 B2 | 1/2013 |
| JP | 2014060621 A | 4/2014 |
| JP | 2018197798 A | 12/2018 |
| JP | 2022038900 A | 3/2022 |
| WO | WO-2021161919 A1 * | 8/2021 ........... H04N 5/2252 |

OTHER PUBLICATIONS

Japanese Notice of Reasons for Refusal dated Jul. 9, 2024, for the corresponding Japanese Patent Application No. 2022-032954, 6 pages. (With English Translation).

Japanese Decision to Grant a Patent dated Oct. 8, 2024, for the corresponding Japanese Patent Application No. 2022-032954, 3 pages. (With English Machine Translation).

* cited by examiner

*Primary Examiner* — Padma Haliyur
(74) *Attorney, Agent, or Firm* — Seed IP Law Group LLP

(57) ABSTRACT

An imaging module according to the present disclosure includes a plurality of components. The imaging module includes a first component and a second component. The first component has a higher light transmittance. The second component has a lower light transmittance. A joint is included in the first component and the second component.

6 Claims, 13 Drawing Sheets

_US 12,231,754 B2_

IMAGING MODULE WITH A CASE HAVING A LIGHT TRANSMISSIVE MEMBER

CROSS-REFERENCE TO RELATED APPLICATIONS

This application is based upon and claims the benefit of priority from Japanese Patent Application No. 2022-032954, filed on Mar. 3, 2022, the entire contents of which are incorporated herein by reference.

FIELD

The present disclosure relates to an imaging module and an assembly method.

BACKGROUND

In recent years, as a result of an increase in the number of pixels of an imaging sensor, a high-quality image has been able to be obtained by using an imaging module that is mounted on a vehicle or the like. In order to achieve high image-quality precision, the accuracy of assembly of an imaging module is also important.

The conventional techniques are disclosed in U.S. Pat. No. 7,965,336 B2, and JP 5129352 B2

The present disclosure provides an imaging module and an assembly method that can facilitate assembly of components.

SUMMARY

An imaging module according to the present disclosure includes a plurality of components. The imaging module includes a first component and a second component. The first component has a higher light transmittance. The second component has a lower light transmittance. A joint is included in the first component and the second component.

DETAILED DESCRIPTION

Embodiments of an imaging module and an assembly method according to the present disclosure are described below with reference to the drawings. Note that in particular, in recent years, on-vehicle cameras have been used for driving assistance, and the image quality of an imaging module has directly affected the accuracy of driving assistance. Therefore, conditions of a reliability test have become more severe. Therefore, an imaging module according to the present embodiment is suitable for on-vehicle cameras.

Embodiments

In the present embodiment, an imaging module refers to a module in which an optical component or the like has been combined with an imaging sensor.

The imaging sensor is an image sensor such as a charge-coupled device (CCD) image sensor or a complementary MOS (CMOS) image sensor.

The optical component is a component that configures a portion or the entirety of an optical system. A lens barrel is an example of the optical component, and is a support cylinder in which an optical lens is disposed. Some lens barrels also include a diaphragm, a shutter, a zoom mechanism, or the like in addition to this. The lens barrel may have a configuration that includes some or all of them.

Note that a configuration of an imaging module that includes the lens barrel serving as the optical component, the imaging sensor, and a connector that is electrically wired to the imaging sensor is described below. However, a configuration of an imaging module is not limited to this. Substitutions, additions, or the like may be made to the configuration.

A configuration of an imaging module and an assembly method of the imaging module are described below. Plural examples are described below. In the case of a repetitive description of a similar place, the description is appropriately omitted, for example, by adding the same reference sign to the drawings.

Figure 1:
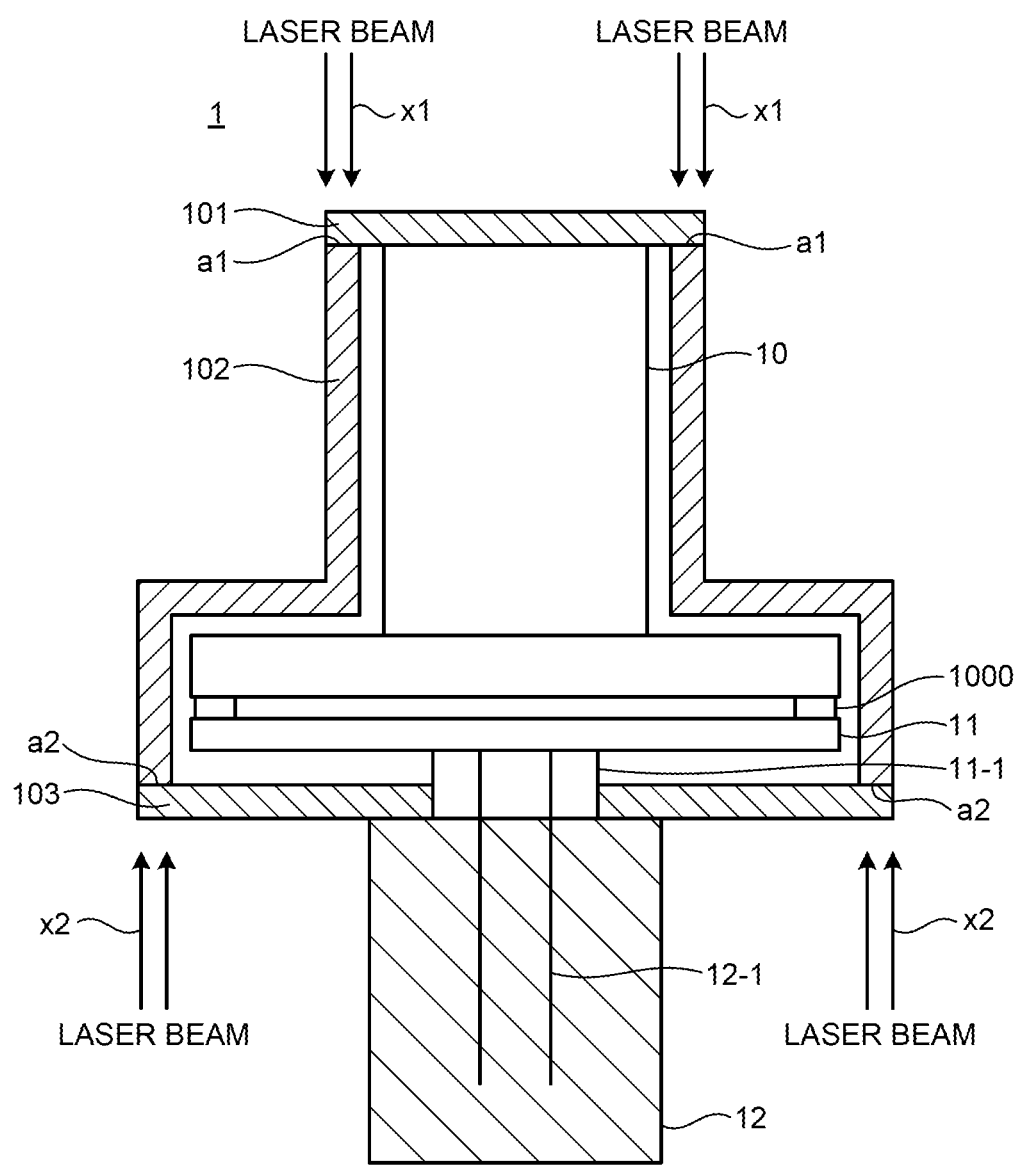
FIG. 1 is a diagram illustrating an example of an imaging module according to an embodiment.

An imaging module according to the present embodiment is illustrated in FIG. 1. A portion of an outer diameter structure is illustrated as a cross section in order to make a configuration understandable. An imaging module 1 has been divided into a lens barrel 10, an imaging sensor that has been provided in a sensor board 11, and a connector 12.

An adhesive 1000 is applied in advance to the sensor board 11 or the lens barrel 10, six-axis adjustment for focusing is performed, and then UV light is applied, and therefore the sensor board 11 and the lens barrel 10 are temporarily fixed. Heat is applied for principal curing, and the sensor board 11 and the lens barrel 10 are fixed. The sensor board 11 and the lens barrel 10 may be fixed by using another fixing unit such as a screw or solder.

In a state where the sensor board 11 and the lens barrel are fixed, the following components are joined to each other. The "joining" here refers to joining by melting a component. For example, welding by melting a resin component or the like is meant. In addition, a place where joining has been performed as described above is referred to as a "joint".

A first component 101 and a second component 102 are a case that houses the lens barrel 10. The first component 101 is joined to the second component 102 that houses the lens barrel 10.

A third component 103 is a case of the connector 12. The third component 103 is joined to the second component 102. By joining the third component 103 to the second component 102, a board mounting connector 11-1 of the sensor board 11 is electrically connected to the connector 12.

The imaging module 1 that has been assembled as described above is driven through electric wiring 12-1 of the connector 12, focuses an image that has been made incident from the lens barrel 10, on an imaging element of the sensor board 11, and outputs a captured image through the electric wiring 12-1. The connector 12 is a connector, such as a communication cable, that is connected to a control device.

In this configuration, portions to be joined are a contact face a1 of the first component 101 and the second component 102 and a contact face a2 of the second component 102 and the third component 103.

The contact face a1 or a2 is a face on which components face each other. What even includes a portion that is not strictly in contact is present is deemed to correspond to a contact face as long as it is to such an extent that joint is possible, and is referred to as a contact face. Note that similar definition of the contact face is applied to another example.

In the present embodiment, a contact face is irradiated with a laser beam, and therefore components are welded together without using an adhesive material.

Specifically, two components that face each other are provided by using a light transmissive member and a light absorptive member. The light transmissive member and the light absorptive member have light transmittances different from each other, with respect to a laser beam to be used. The light transmissive member is a member that has a high light transmittance with respect to a laser beam to be used. The light absorptive member is a member that has a low light transmittance with respect to the laser beam.

A laser beam is applied toward the light absorptive member from a side of the light transmissive member. Strictly speaking, the laser beam is applied aiming at a contact face of the light transmissive member and the light absorptive member from a side of a surface of the light transmissive member. According to this scheme, the applied laser beam is transmitted through the light transmissive member, reaches the light absorptive member, and is absorbed by the light absorptive member on the contact face, and heat is generated. As a result of heat generation, the light absorptive member is melted on the contact face, and the members are welded (joined) together on the contact face.

Note that the laser beam is an example, and another irradiation unit may be used if the components can be welded together.

In FIG. 1, the first component 101 is the light transmissive member. The second component 102 is the light absorptive member. Then, the third component 103 is the light transmissive member.

The first component 101 and the second component 102 are joined by applying a laser beam aiming at the contact face a1 of the second component 102 from a surface of the first component 101.

In FIG. 1, an irradiation orientation and an irradiation range of the laser beam are illustrated as arrow x1. The laser beam is applied between two arrows x1 that are arranged in the same place. Note that an irradiation position of the laser beam may be slightly shifted if the irradiation position is located between the two arrows x1. In addition, the laser beam may be applied between the two arrows x1 while the irradiation position of the laser beam is shifted, and an irradiation width may be increased, as needed.

Note that an outer shape of the lens barrel 10 is a circle in a plan view from a side of an incident face of light, that is, in an orientation of arrow x1 of the laser beam, and therefore the contact face a1 of the first component 101 and the second component 102 runs round along the circle. The contact face a1 is configured along the circle of the outer shape of the lens barrel 10, and therefore the laser beam is applied to the entirety of the contact face, and the components are joined together. The sectional view of FIG. 1 only illustrates a left-hand end and a right-hand end of the second component 102 that is located on the entire circumference of the contact face, and therefore two arrows x1 are illustrated for each of the left-hand end and the right-hand end.

On the other hand, the second component 102 and the third component 103 are joined by applying a laser beam aiming at the contact face a2 of the second component 102 from a surface of the third component 103. In FIG. 1, an irradiation orientation of the laser beam is illustrated as arrow x2.

In a plan view of the contact face a2 of the second component 102 and the third component 103 from a side of the connector 12, that is, in an orientation of arrow x2 of the laser beam, an edge portion of an opening of the second component 102 runs all around the sensor board 11. The contact face a2 is configured around the sensor board 11. Therefore, the laser beam is applied to the entirety of the contact face, and the components are joined together. The sectional view of FIG. 1 only illustrates a left-hand end and a right-hand end of the third component 103 that is located on the entire circumference of the contact face, and therefore two arrows x2 are illustrated for each of the left-hand end and the right-hand end.

Note that in a case where components are joined together, the laser beam may be applied to each of the contract faces according to a method for fixing an irradiation orientation of a laser head and causing the components to rotate, or the laser beam may be applied onto each of the contact faces while moving the laser head.

Examples of Laser Beam, Light Transmissive Member, and Light Absorptive Member

Here, an example of a relationship among a laser beam, a light transmissive member, and a light absorptive member is described.

Members

Resin Material

As a material that is suitable for laser welding, polybutylene terephthalate (PBT) resin, polyamide (PA) resin, or the like can be used.

Note that a resin may include a reinforcing agent such as a glass filler.

Laser

Yttrium aluminum garnet (YAG) laser of 1060 to 1070 nm that serves as near infrared light, or the like can be used.

In addition, 949 nm (semiconductor laser) or the like can also be used.

Resin Transmittance

It is desirable that with respect to the laser beam, a material that has a transmittance of 20% or more be used for a resin (a transmissive material), and a material that has an absorptivity of 90% or more be used for an absorptive material. Note that this is not restrictive depending on matching of irradiation conditions or the like of the laser beam. In addition, color mixing has been performed in such a way that even the transmissive material does not transmit a visible light wavelength, and the entry of visible light into an on-vehicle camera is restricted.

As described above, by employing a combination of the members described in the present embodiment, joint by melting a component by applying a laser beam is possible. Further, after a light absorptive member has been melted by applying the laser beam, the members are pressurized and are fixed to each other by applying pressure. This results in a further increase in adhesive property. The light absorptive member is melted and joined, and therefore joining can be performed in such a way that a contact face becomes smooth. By employing this method, assembly is easily performed. In addition, an adhesive is not used, and therefore reliability conditions are maintained even in a severe use environment. An imaging module can continue to be reliably used over a long period.

Variation of Case Shape of Imaging Module 1

Figure 2:
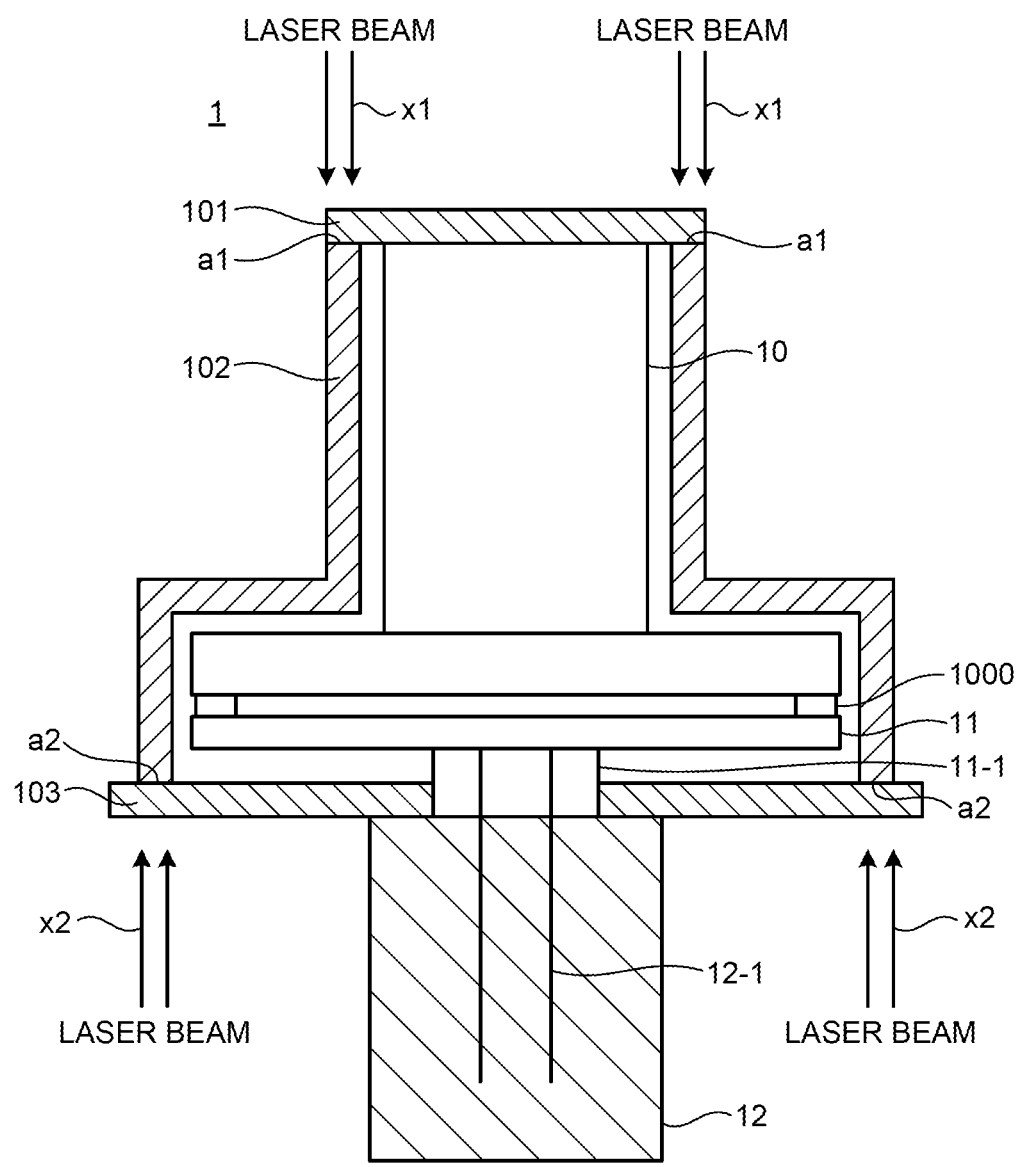
FIG. 2 is a diagram illustrating another example of a case shape of the imaging module according to the embodiment.

FIG. 2 illustrates an example of a cross section in a case where a case shape of the imaging module according to the present embodiment has been changed. The imaging module 1 of FIG. 2 is an example in a case where the third component 103 has an outer shape having a diameter that is greater than a diameter of the second component 102 in a plan view from a side of the connector 12.

In this case, mounting is performed according to a mounting method that is similar to the mounting method of FIG. 1. The third component 103 has an outer shape having a diameter that is greater than the diameter of the second component 102, and this results in an increase in a degree of freedom so that before joining, the connector 12 is fitted into the board mounting connector 11-1 while the third component 103 is moved in an upward, downward, leftward, or rightward direction. This facilitates connection to the board mounting connector 11-1.

Variation of Mounting Method of Imaging Module 1

Figure 3:
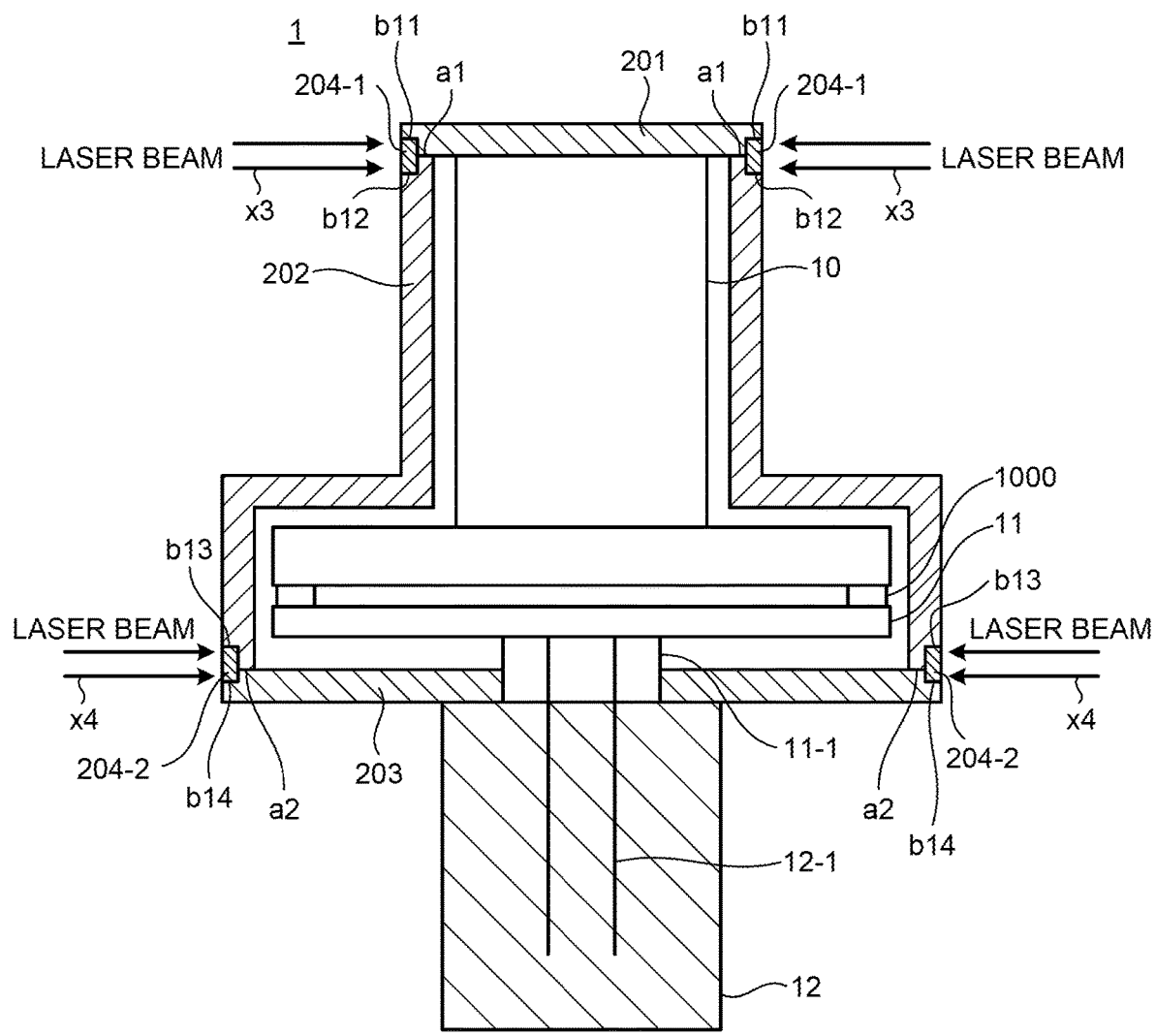
FIG. 3 is a diagram illustrating a variation of a mounting method of the imaging module according to the embodiment.

FIG. 3 illustrates a variation of a mounting method of the imaging module 1. The imaging module 1 of FIG. 3 has a configuration in a case where mounting of a first component 201 and a second component 202 and mounting of the second component 202 and a third component 203 are performed by using a fourth component 204.

The light absorptive member is used for all of the first component 201, the second component 202, and the third component 203, the light transmissive member is used for the fourth component 204, and the members are joined together.

As illustrated in FIG. 3, the first component 201 and the second component 202 respectively include cutouts b11 and b12. By combining the first component 201 and the second component 202, the cutout b11 of the first component 201 and the cutout b12 of the second component 202 form a groove in which a fourth component 204-1 is housed.

The groove that has been formed by the cutout b11 of the first component 201 and the cutout b12 of the second component 202 runs round along the outer shape of the lens barrel 10. The fourth component 204-1 is fitted into the groove along the outer shape of the lens barrel 10.

The fourth component 204-1 may be a ring-shaped component that is fitted into the entirety of the groove, or may be divided components that are divided and embedded along the groove.

In a case where the fourth component 204-1 is a ring-shaped component, mounting is performed according to a method for fitting the fourth component 204-1 having a ring shape into a cutout (the cutout b11 or the cutout b12) of one of the first component 201 and the second component 202, and joining the first component 201 and the second component 202.

Similarly, the second component 202 and the third component 203 respectively include cutouts b13 and b14 that correspond to a fourth component 204-2. By joining the second component 202 and the third component 203, the cutout b13 of the second component 202 and the cutout b14 of the third component 203 form a groove in which the fourth component 204-2 is housed. The groove runs round along an outer shape of an opening of the second component 202. The fourth component 204-2 is fitted into the groove along the outer shape of the opening.

A mounting method in a case where the fourth component 204-2 is a ring-shaped component is similar. Mounting is performed according to a method for fitting the fourth component 204-2 having a ring shape into a cutout (the cutout b13 or the cutout b14) of one of the second component 202 and the third component 203, and joining the second component 202 and the third component 203.

In addition, joining of the first component 201 and the second component 202 and joining of the second component 202 and the third component 203 are performed by applying a laser beam to the respectively provided fourth components 204 (the fourth component 204-1 and the fourth component 204-2, respectively). The laser beam is applied in orientations respectively illustrated as arrows x3 and x4 in FIG. 3. Stated another way, in joining the first component 201 and the second component 202, the entire surface of the fourth component 204-1 is irradiated from an outer circumferential direction of the lens barrel 10. In joining the second component 202 and the third component 203, the entire surface of the fourth component 204-2 is irradiated from an outer circumferential direction of the opening of the second component 202. By applying the laser beam as described above, the melting of the first component 201 and the second component 202 results in the components welded together, and the melting of the second part 202 and the third part 203 results in the components welded together.

FIGS. 4 to 8 are diagrams each illustrating an example of another form of the imaging module. FIGS. 4 to 8 illustrate a configuration in which the lens barrel 10 is joined to a connection component of the board mounting connector 11-1 and the connector 12.

Figure 4:
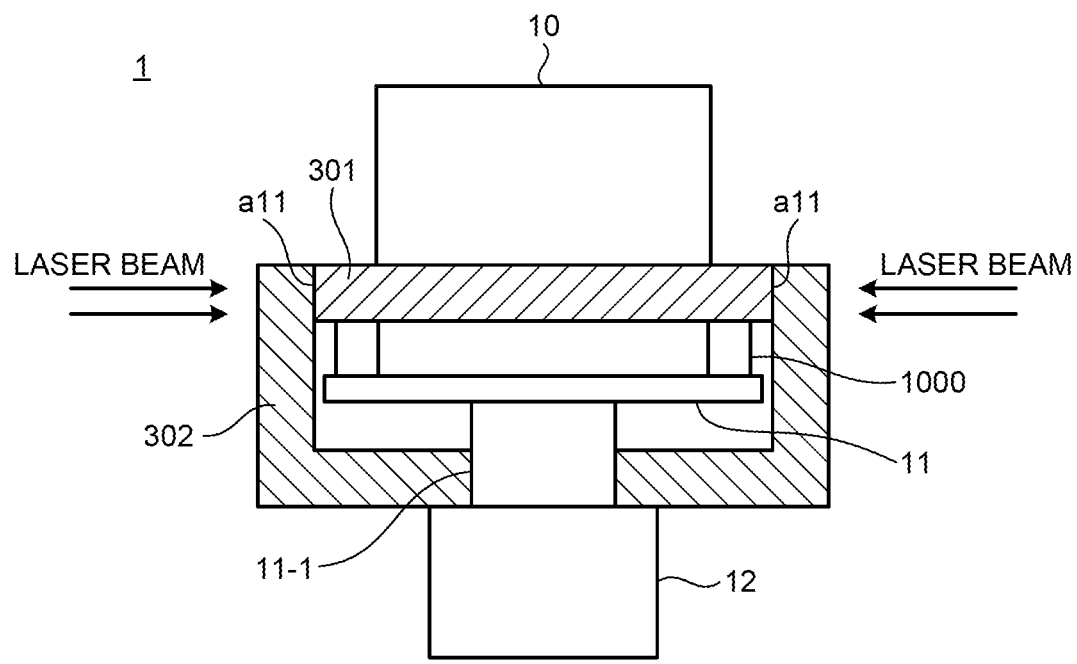
FIG. 4 is a diagram illustrating an example of another form of the imaging module according to the embodiment (no. 1)

In the configuration illustrated in FIG. 4, a pedestal of the lens barrel 10 is a first component 301, and a connection component of the board mounting connector 11-1 and the connector 12 is a second component 302. By joining the first component 301 and the second component 302, the imaging module 1 is configured.

The adhesive 1000 is applied in advance to the sensor board 11 or the pedestal of the lens barrel 10, six-axis adjustment for focusing is performed, and then UV light is applied, and therefore the sensor board 11 and the pedestal of the lens barrel 10 are temporarily fixed. Heat is applied for principal curing, and the sensor board 11 and the pedestal of the lens barrel 10 are fixed. The adhesive 1000 is applied to the sensor board 11 or the pedestal of the lens barrel 10 in two or more places. In a rectangular configuration, the adhesive is applied in two or more places of four corners. Accordingly, the number of places where the sensor board 11 and the lens barrel 10 are fixed to each other is two or more. Note that the sensor board 11 and the pedestal of the lens barrel 10 are not always fixed by using a fixing unit using the adhesive 1000, and may be fixed by using another fixing unit such as a screw or solder.

The pedestal (the first component 301) of the lens barrel 10 is a component having enough size to bring an edge portion into contact with an inner face of the second component 302 in an opening of the second component 302.

The second component 302 is open on a side of mounting the first component 301 (referred to as a front side), and includes a housing space in which the sensor board 11 is housed. A face on a rear side includes a hole through which the board mounting connector 11-1 of the sensor board 11 is connected to the connector 12.

In this configuration, a portion to be joined is a contact face a11 of the edge portion of the first component 301 and an inner face of the opening of the second component 302. The light absorptive member is used for the first component 301, and the light transmissive member is used for the second component 302. A laser beam is applied aiming at the contact face a11 of the light transmissive member and the light absorptive member from a side of a surface of the light transmissive member.

The laser beam is applied in an irradiation orientation of the arrow illustrated in FIG. 4. As a method for applying the laser beam, the method described above is appropriately employed. The contact face a11 of the first component 301 and the second component 302 runs all around the lens barrel 10. Accordingly, as described above, the laser beam is applied to the entirety of the contact face.

By employing such a configuration, the imaging module 1 can be configured by joining the first component 301 and the second component 302. The number of components is reduced, and assembly is facilitated.

Figure 5:
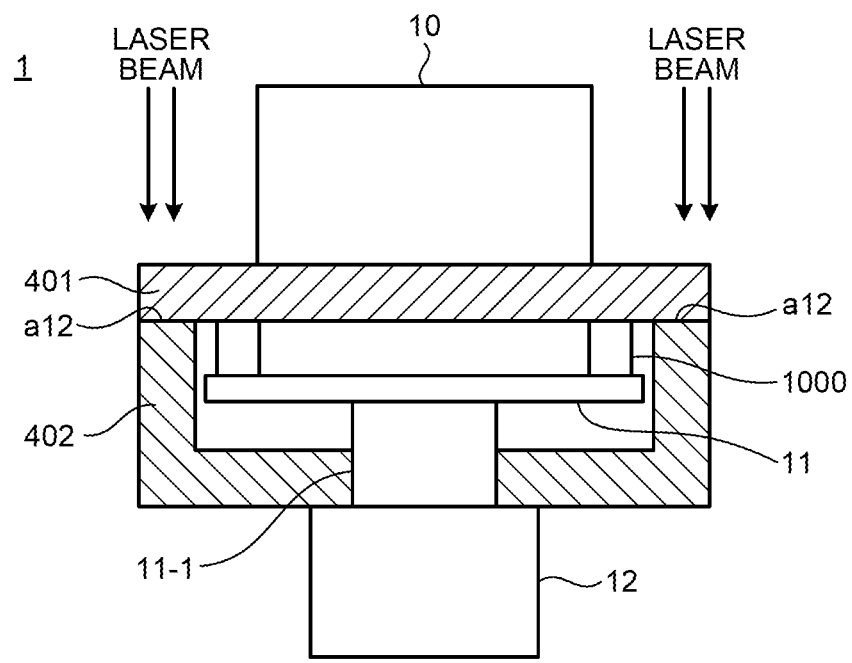
FIG. 5 is a diagram illustrating an example of another form of the imaging module according to the embodiment (no. 2)

In the configuration illustrated in FIG. 5, a pedestal (a first component 401) of the lens barrel 10 is a component having the same size as a size of an outer circumference of a second component 402 on a side of an opening of the second component 402. The other portion is the same as a portion in FIG. 4.

In this configuration, a portion to be joined is a contact face a12 of an edge portion of the first component 401 and an outer circumferential portion of the opening of the second component 402. The light transmissive member is used for the first component 401, and the light absorptive member is used for the second component 402.

A laser beam is applied in an irradiation orientation of the arrow illustrated in FIG. 5. The contact face a12 of the first component 401 and the second component 402 runs all around the lens barrel 10, and therefore the laser beam is applied to the contact face a12 around the lens barrel 10.

Figure 6:
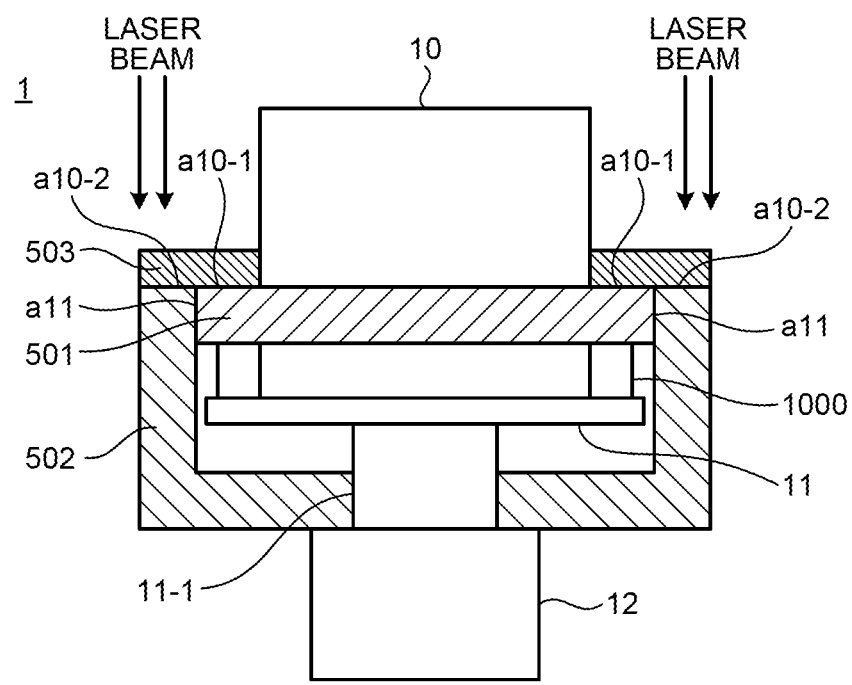
FIG. 6 is a diagram illustrating an example of another form of the imaging module according to the embodiment (no. 3)

The configuration illustrated in FIG. 6 is a configuration in a case where joining is performed by using a third component. Shapes of a first component 501 and a second component 502 are respectively similar to shapes of the first component 301 and the second components 302 illustrated in FIG. 4. A third component 503 is disposed to cover an edge of a contact face a11 of the first component 501 and the second component 502 from a direction in which a laser beam is applied, and come into contact with the first component 501 and the second component 502. The third component 503 has, for example, a shape that covers the edge from above a pedestal of the lens barrel 10, and includes a hole that exposes a cylinder of a body of the lens barrel 10 to the outside, in a position that corresponds to the cylinder excluding the pedestal.

In the configuration illustrated in FIG. 6, the light absorptive member is used for the first component 501 and the second component 502, and the light transmissive member is used for the third component 503.

A laser beam is applied in an irradiation orientation of the arrow illustrated in FIG. 6. The laser beam is applied to the third component 503, and a contact face a10-1 of the third component 503 and the first component 501 and a contact face a10-2 of the third component 503 and the second component 502 are melted, and therefore the first component 501, the second component 502, and the third component 503 are welded.

Figure 7:
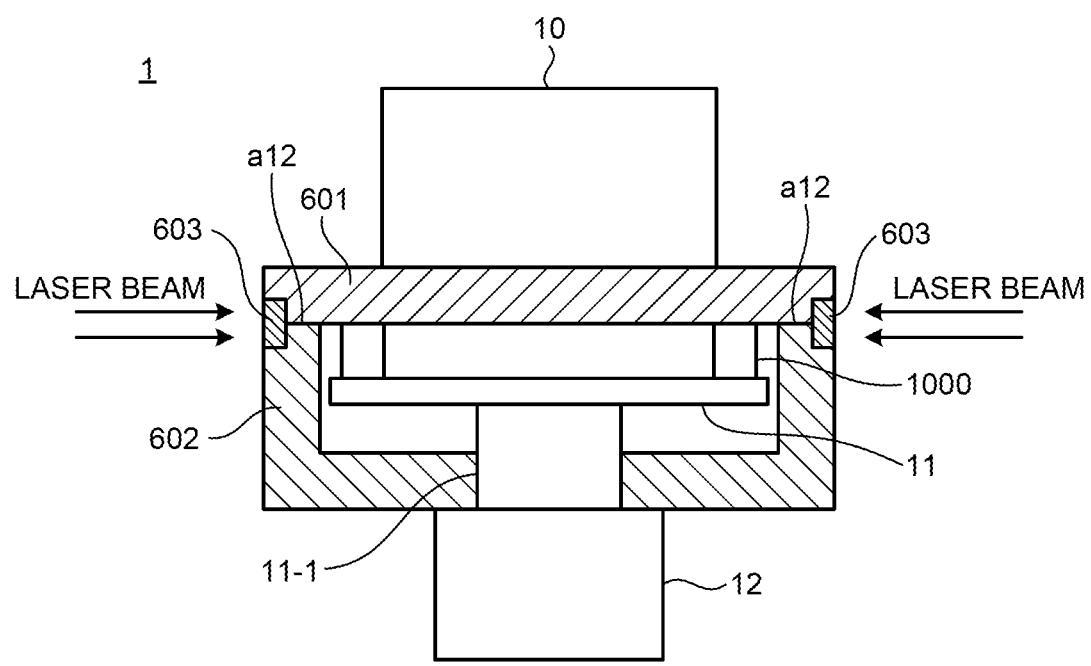
FIG. 7 is a diagram illustrating an example of another form of the imaging module according to the embodiment (no. 4)

The configuration illustrated in FIG. 7 is another configuration in a case where joining is performed by using a third component. A first component 601 and a second component 602 respectively correspond to components obtained by providing a cutout serving as a groove in the first part 401 and the second part 402 that are illustrated in FIG. 5. The groove is provided in such a way that a contact face a12 of the first part 601 and the second part 602 is included. A configuration of the cutout is similar to the configuration illustrated in FIG. 3. A third component 603 and the groove correspond to the fourth component 204 and the groove that are illustrated in FIG. 3. In this configuration, the light absorptive member is used for the first component 601 and the second component 602, and the light transmissive member is used for the third component 603.

A laser beam is applied in an irradiation orientation of the arrow illustrated in FIG. 7. The laser beam is applied to the third component 603 according to a method that is similar to the method illustrated in FIG. 3 for applying a laser beam to the fourth component 204, and the first component 601, the second component 602, and the third component 603 are welded.

Figure 8:
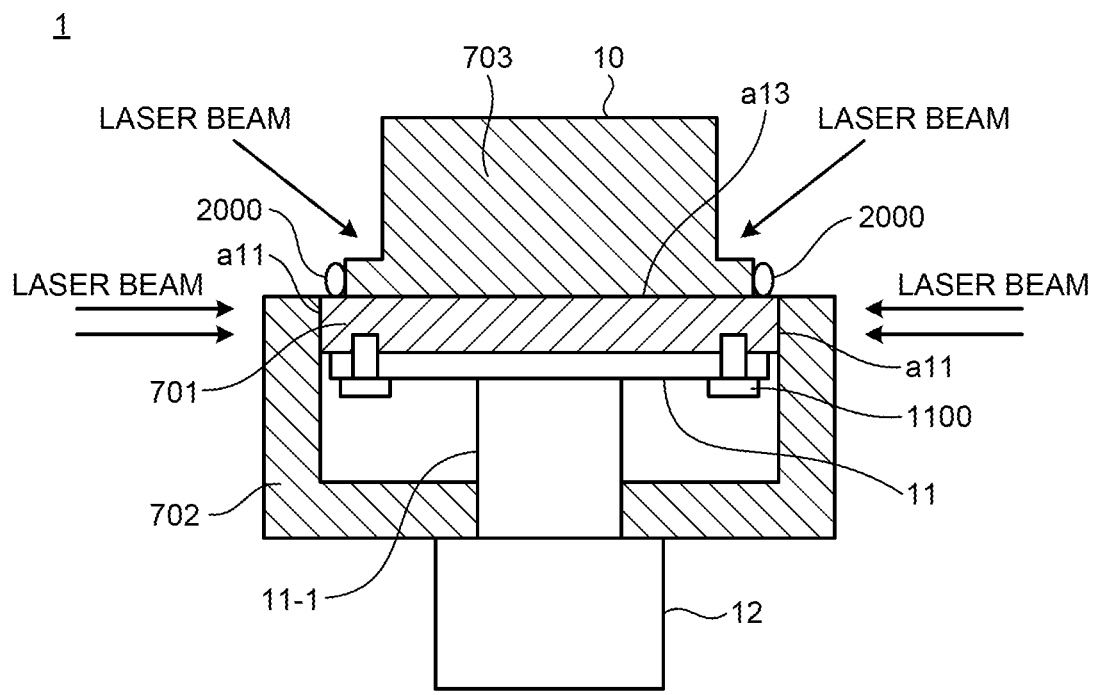
FIG. 8 is a diagram illustrating an example of another form of the imaging module according to the embodiment (no. 5)

The configuration illustrated in FIG. 8 is a configuration in a case where the light transmissive member is used for the entirety of the lens barrel 10. Shapes of a first component 701 and a second component 702 are respectively similar to shapes of the first component 301 and the second component 302 that are illustrated in FIG. 4. A third component 703 is the lens barrel 10.

In this example, the sensor board 11 is fixed to the first component 701 by using a screw 1100, but may be fixed by using a fixing unit such as an adhesive or solder.

In the configuration illustrated in FIG. 8, the light absorptive member is used for the first component 701, and the light transmissive member is used for the second component 702. In addition, the light transmissive member is used for the third component 703.

A laser beam is applied in an irradiation orientation of the arrow illustrated in FIG. 8. In this configuration, joining is performed in two places, a contact face a11 of the first component 701 and the second component 702, and a contact face a13 of the first component 701 and the third component 703.

A method for applying the laser beam to the contact face a11 of the first component 701 and the second component 702 is the same as the method of FIG. 4. With respect to the contact face a13 of the first component 701 and the third component 703, an edge portion of a pedestal of the third component 703 is used, and the laser beam is applied aiming at the contact face a13 of the first component 701 and the third component 703. The laser beam is applied aiming at the contact face a13 that is located inside from an oblique direction, as illustrated in FIG. 8, but an irradiation direction may be appropriately determined. It is sufficient if a region where the first component 701 and the third component 703 are to be joined can be irradiated.

In addition, in the configuration illustrated in FIG. 8, the lens barrel 10 is joined. Therefore, a gap between an edge portion of a pedestal of the lens barrel 10 and the first component 701 is filled with a sealant 2000 for waterproofing in such a way that moisture or the like does not enter from the gap. Note that a sealing unit other than a sealant may be used if the gap can be sealed. A material that performs sealing, such as a sealant, is collectively referred to as a sealing material.

Specific Implementation of Each Form

Figure 9:
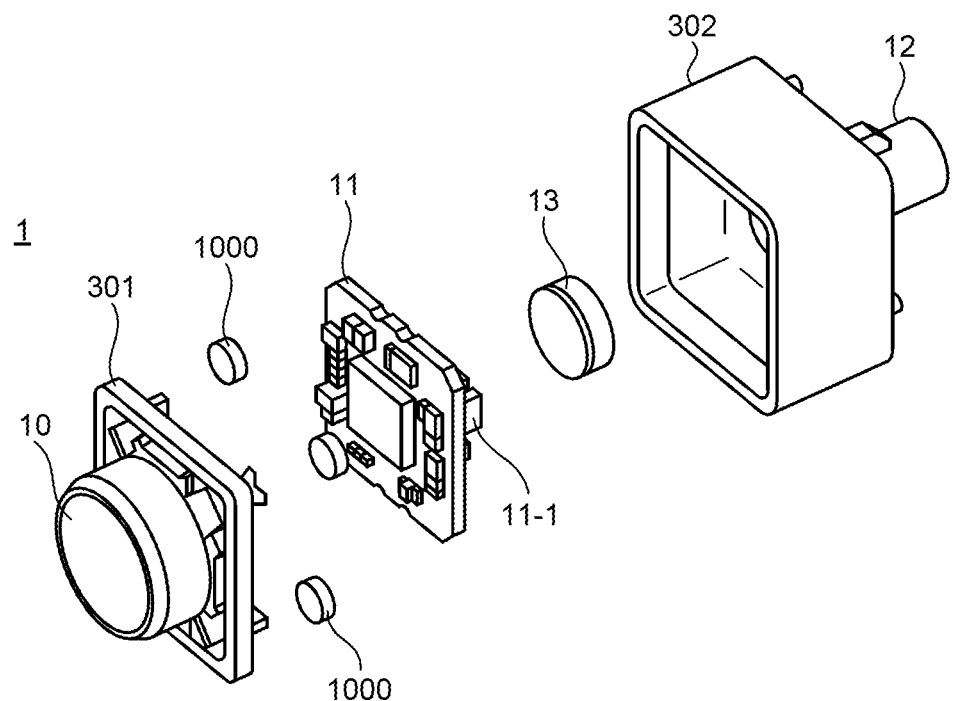
FIG. 9 is an exploded configuration diagram of the configuration of FIG. 4 or 5 according to the embodiment.
Figure 10:
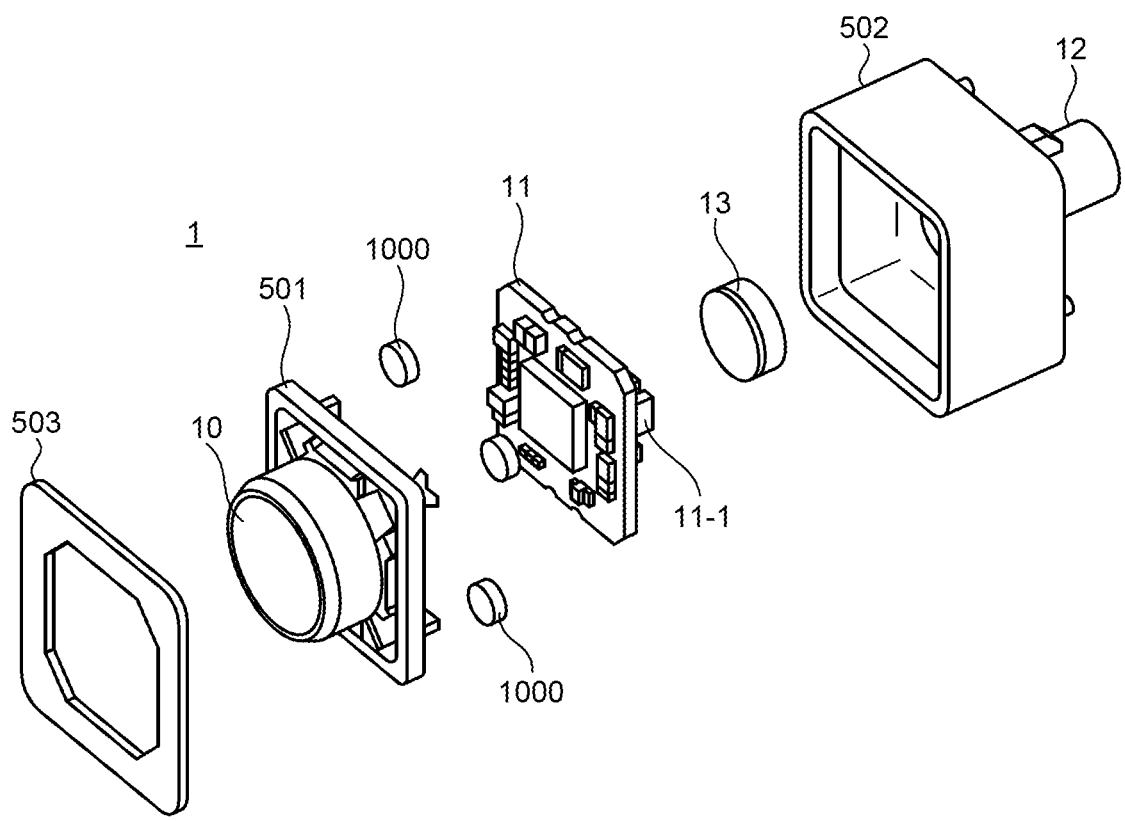
FIG. 10 is an exploded configuration diagram of the configuration of FIG. 6 according to the embodiment.

With reference to FIGS. 9 and 10, implementation is described by using more specific examples. FIG. 9 is an exploded configuration diagram in a case where the configuration of FIG. 4 or FIG. 5 is employed. FIG. 10 is an exploded configuration diagram in a case where the configuration of FIG. 6 is employed.

The description of FIG. 9 is provided by using the configuration of FIG. 4 as an example. In the example illustrated in FIG. 9, the pedestal of the first component 301 is configured in the lens barrel 10. The light absorptive member is used for the first component 301, and the light transmissive member is used for the second component 302.

In the example illustrated in FIG. 9, first, the sensor board 11 and the lens barrel 10 are fixed in two or more places, by using the adhesive 1000. In this example, the adhesive 1000 is applied in advance to the sensor board 11 or the pedestal of the lens barrel 10, six-axis adjustment for focusing is performed, and then UV light is applied, and therefore temporary fixing is performed. Heat is applied for principal curing, and fixing is performed. The adhesive 1000 is applied in two or more places of four corners. In this example, a heat dissipation member 13 is further equipped on a side of a rear face of the sensor board 11. Then, the first component 301 is disposed to come into contact with the inner face of the opening of the second component 302, and a laser beam is applied to a contact face of an edge portion of a rectangle of the first component 301 and the inner face of the opening of the second component 302. Note that a protrusion that holds the first component 301 for alignment may be provided on the inner face of the second component 302.

On the other hand, in the example illustrated in FIG. 10, the light absorptive member is used for the first component 501 and the second component 502, the third component 503 serving as the light transmissive member is disposed, and a laser beam is applied to the third component 503. In an assembly procedure, first, the sensor board 11 and the lens barrel 10 are fixed in two or more places, by using the adhesive 1000. In this example, the adhesive 1000 is applied in advance to the sensor board 11 or the pedestal of the lens barrel 10, six-axis adjustment for focusing is performed, and then UV light is applied, and therefore temporary fixing is performed. Heat is applied for principal curing, and fixing is performed. The adhesive 1000 is applied in two or more places of four corners. In this example, the heat dissipation member 13 is further equipped on a side of the rear face of the sensor board 11. Then, the first component 501 is disposed to come into contact with an inner face of an opening of the second component 502, and the third component 503 is further disposed. A laser beam is applied toward a surface of the third component 503.

Note that a protrusion for alignment may be provided on the inner face of the second component 502 in such a way that a contact face of the first component 501 is located at the same height as the height of a contact face of the second component 502.

In addition, an assembly procedure is not limited to this. For example, the first component 501 and the third component 503 may be welded by applying a laser beam, the third component 503 after welding may be disposed on the second component 502, and the laser beam may be applied.

FIGS. 11 to 15 illustrate mounting procedures of various forms of imaging modules. Each arrow illustrated in FIGS. 11 to 15 indicates an irradiation direction of a laser beam. As described above, the laser beam is applied aiming at a contact face of the light transmissive member and the light absorptive member from a side of the light transmissive member. Accordingly, description is provided under the assumption that a member pointed by each of the arrows is the light absorptive member and a member that is located on the near side in a direction of the arrow is the light transmissive member, but this is not particularly described below.

Figure 11:
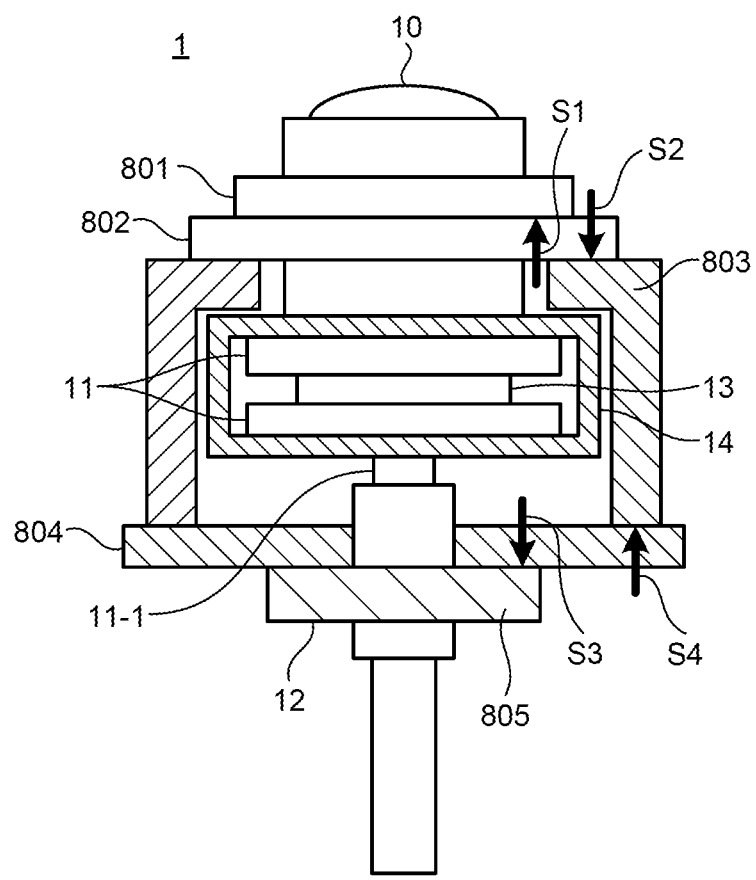
FIG. 11 is a diagram illustrating an example of mounting procedures of various forms of the imaging module according to the embodiment.

The imaging module 1 illustrated in FIG. 11 has a configuration in which a heat dissipation material 13 is included between two boards 11, and the periphery of the boards 11 is covered with a shielding plate 14.

First, a first component 801 and a second component 802 are joined (Step S1). Next, the second component 802 and a third component 803 are joined (Step S2). Then, the sensor boards 11 that are provided with the shielding plate 14 are made to adhere to a side of the lens barrel 10. Next, a fourth component 804 and a fifth component 805 are joined (Step S3). Then, the third component 803 and the fourth component 804 are joined (Step S4).

Figure 12:
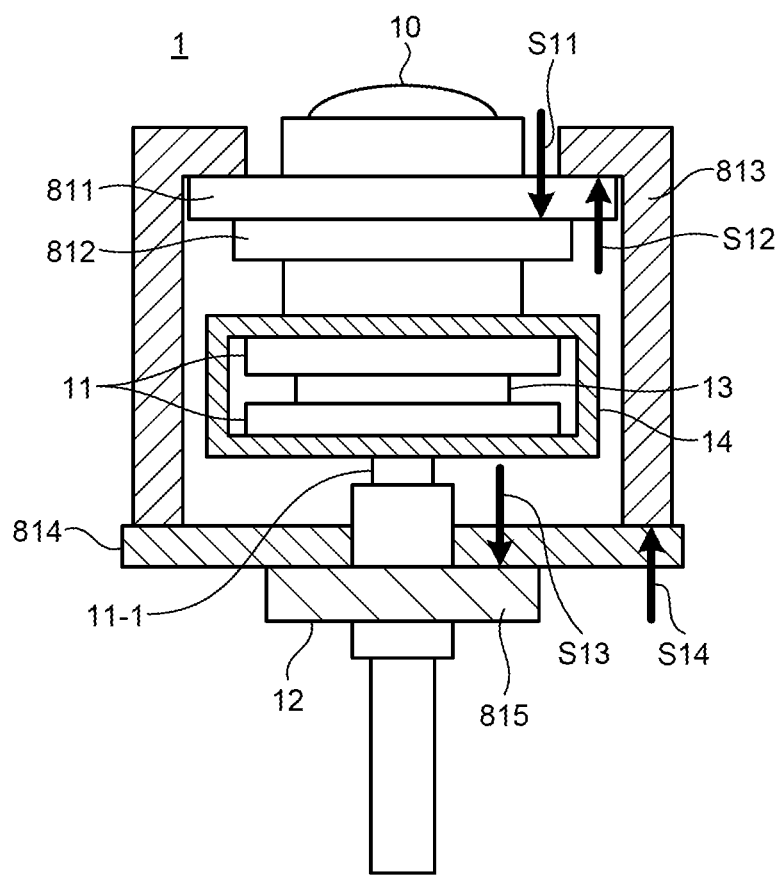
FIG. 12 is a diagram illustrating an example of mounting procedures of various forms of the imaging module according to the embodiment.

In a configuration of the imaging module 1 illustrated in FIG. 12, assembly is performed as follows. First, a first component 811 and a second component 812 are joined (Step S11). Next, the first component 811 and a third component 813 are joined (Step S12). Then, the sensor boards 11 that are provided with the shielding plate 14 are made to adhere to a side of the lens barrel 10. Next, a fourth component 814 and a fifth component 815 are joined (Step S13). Then, the third component 813 and the fourth component 814 are joined (Step 14).

Figure 13:
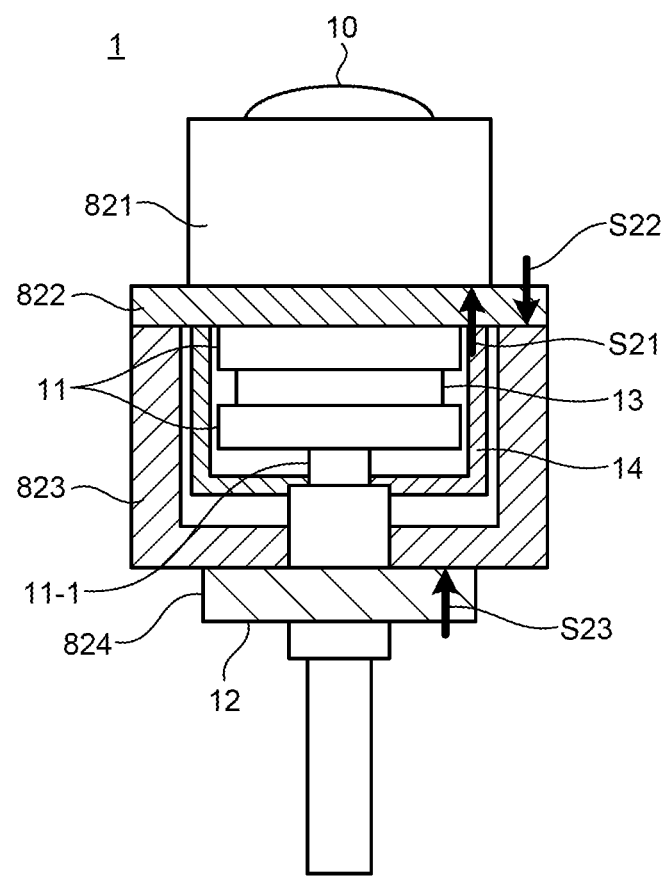
FIG. 13 is a diagram illustrating an example of mounting procedures of various forms of the imaging module according to the embodiment.

In a configuration of the imaging module 1 illustrated in FIG. 13, assembly is performed as follows. First, a first component 821 and a second component 822 are joined (Step S21). Then, the sensor boards 11 that are provided with the shielding plate 14 are made to adhere to a side of the lens barrel 10. Next, a third component 823 and the second component 822 are joined (Step S22). Then, a fourth component 824 and the third component 823 are joined (Step S23). Note that the order of Step S22 and Step S23 may be reversed.

Figure 14:
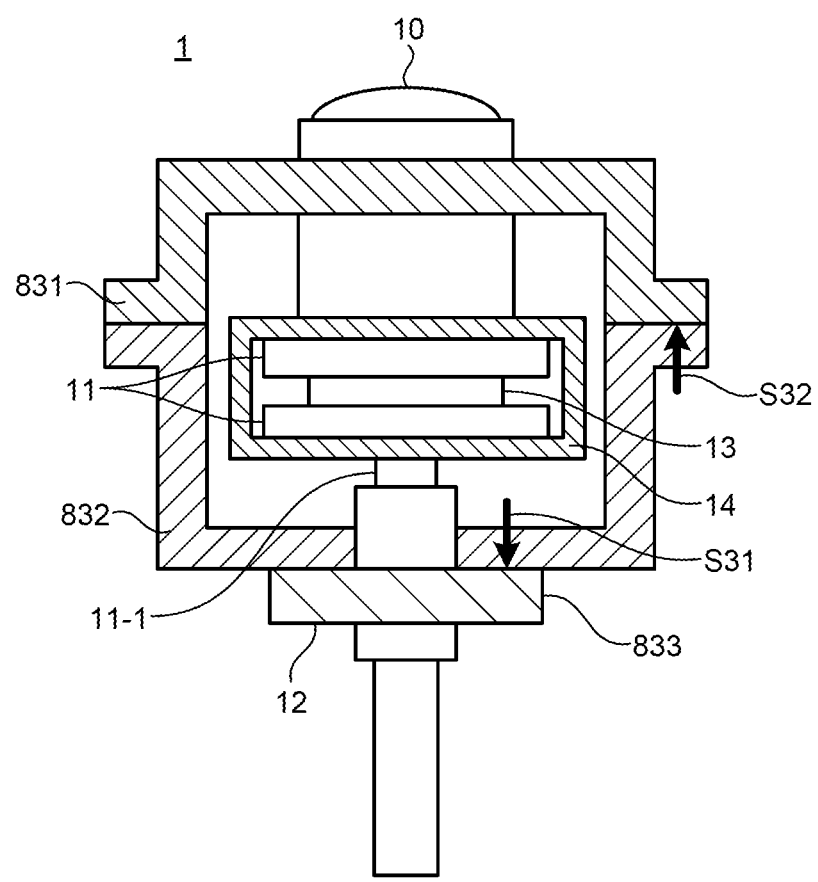
FIG. 14 is a diagram illustrating an example of mounting procedures of various forms of the imaging module according to the embodiment.

In a configuration of the imaging module 1 illustrated in FIG. 14, assembly is performed as follows. Note that it is assumed that the sensor boards 11 that are provided with the shielding plate 14 adhere to a side of the lens barrel 10. First, a second component 832 and a third component 833 are joined (Step S31). Next, the board mounting connector 11-1 and the connector 12 are connected, and a first component 831 and the second component 832 are joined (Step S32).

Figure 15:
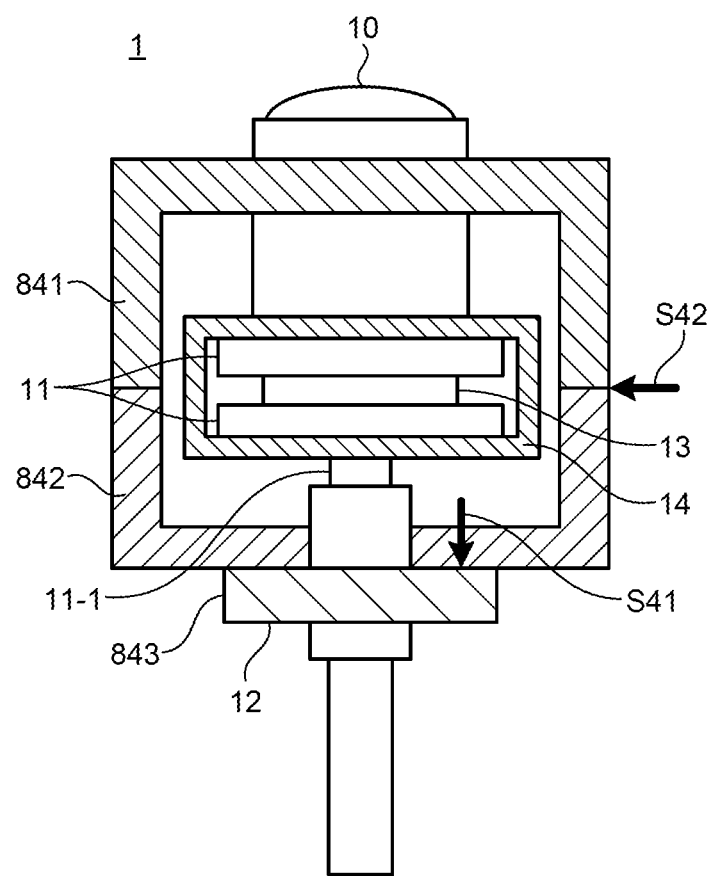
FIG. 15 is a diagram illustrating an example of mounting procedures of various forms of the imaging module according to the embodiment.

In a configuration of the imaging module 1 illustrated in FIG. 15, assembly is performed as follows. Note that it is assumed that the sensor boards 11 that are provided with the shielding plate 14 adhere to a side of the lens barrel 10. First, a second component 842 and a third component 843 are joined (Step S41). Next, the board mounting connector 11-1 and the connector 12 are connected, and a first component 841 and the second component 842 are joined (Step S42).

As described above, an assembly method changes according to a configuration, but assembly can be easily performed by applying a laser beam.

Method for Fixing Lens Barrel 10 and Sensor Board 11

It has been described above that the lens barrel 10 and the sensor board 11 are fixed by using a fixing unit such as an adhesive, a screw, or solder, but fixing may be performed by performing laser welding.

Figure 16:
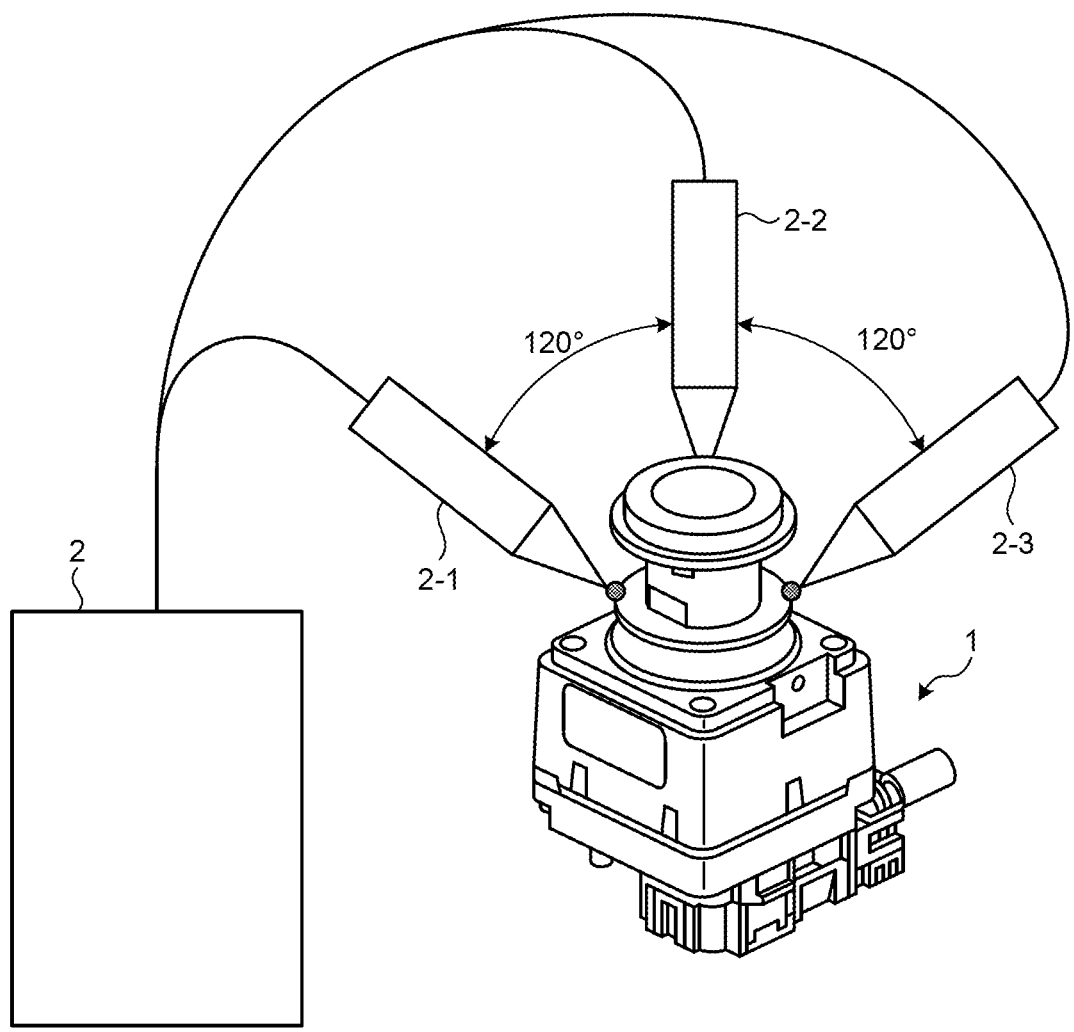
FIG. 16 is a diagram illustrating an example of a case where a lens barrel and a sensor board according to the embodiment are fixed by performing laser welding.

As illustrated in FIG. 16, the lens barrel 10 is disposed on the sensor board 11 after performing six-axis adjustment for focusing and performing alignment, a laser beam is simultaneously applied from a laser device body 2 by using respective laser heads 2-1, 2-2, and 2-3 that are disposed in such a way that aimed positions are shifted from each other, and fixing is performed in three aimed places by performing laser welding. In FIG. 16, as an example, the laser beam is simultaneously applied to an edge portion of the lens barrel 10 from the respective laser heads 2-1, 2-2, and 2-3, aiming at positions of 0°, 120°, and 240° of a circumference of 360°. As described above, the laser beam is simultaneously applied, and three places are welded. Therefore, axial misalignment of a sensor face and an optical system is avoided, and image blur or the like is avoided.

Note that an example where an interval of 120° is employed and a laser beam is applied toward three places has been described here as an example. However, the number of irradiation places is not limited to three. The number of irradiation places may be increased to three or more, if the irradiation places are disposed at equal intervals, for example, at intervals of 30°, around an optical axis.

By simultaneously performing welding from three directions or the like, as described above, out-of-focus is avoided, and image quality can be maintained for a long time period. In particular, welding is optimal in order to improve reliability and avoid the occurrence of out-of-focus. In lens adjustment, adjustment and fixing in units of 1 μm is needed. However, if a laser is only applied and fixing is performed, a lens moves in units of 100 μm, and this fails to be used to fix a lens. As described in the present embodiment, a laser beam having the same intensity is applied, for example, from three directions branched every 120°, and therefore fixing in units of 1 μm can be performed.

An imaging module according to the present disclosure can facilitate assembly of components.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A vehicular camera comprising:
   a lens barrel including at least one optical lens;
   a sensor board having a first surface facing the at least one optical lens and a second surface opposing to the first surface;
   an imaging sensor disposed on the sensor board;
   a board mounted connector disposed on the second surface of the sensor board;
   a case accommodating at least the sensor board; and
   a case connector disposed on a part of the case that is coupled to the board mounted connector, the case connector configured to connect to an external cable,
   wherein the case includes:
      a first component supporting the lens barrel, the first component having a third surface, a fourth surface opposing to the third surface and facing at least a part of the first surface of the sensor board, and end surfaces arranged between the third surface and the fourth surface,
         the end surfaces including a first end surface, a second end surface, a third end surface, and a fourth end surface;
      a second component including a rear portion, a first side wall portion, a second side wall portion, a third side wall portion, a fourth side wall portion,
         the rear portion facing at least a part of the second surface of the sensor board,
         the case connector disposed on the rear portion, and
         the rear portion having a rectangular shape,
         the first side wall portion, the second side wall portion, the third side wall portion, and the fourth side wall portion extending from respective sides of the rear portion toward the fourth surface of the first component,
         the first side wall portion having a first outer surface, a first inner surface, and a first end portion opposing to the rear portion,
         the second side wall portion having a second outer surface, a second inner surface, and a second end portion opposing to the rear portion,
         the third side wall portion having a third outer surface, a third inner surface, and a third end portion opposing to the rear portion, and
         the fourth side wall portion having a fourth outer surface, a fourth inner surface, and a fourth end portion opposing to the rear portion,
   wherein at least a part of the sensor board is disposed between the first inner surface of the first side wall portion and the third inner surface of the third side wall portion, and at least a part of the sensor board is disposed between the second inner surface of the second side wall portion and the fourth inner surface of the fourth side wall portion,
   wherein the fourth surface of the first component includes a first contact portion contacting the first end portion of the first side wall portion of the second component, a second contact portion contacting the second end portion of the second side wall portion of the second component, a third contact portion contacting the third end portion of the third side wall portion of the second component, and a fourth contact portion contacting the fourth end portion of the fourth side wall portion of the second component,
   wherein the case includes a groove and a ring-shaped component,
      the groove extending across the first end surface, the second end surface, the third end surface, and the fourth end surface of the first component, and extending across the first outer surface of the first side wall portion, the second outer surface of the second side wall portion, the third outer surface of the the third side wall portion, and the fourth outer surface of the fourth side wall portion of the second component, the groove including a first side surface, a second side surface facing the first side surface, and a base surface, the ring-shaped component arranged in the groove, wherein the first component and the second component of the case includes a light absorptive material configured to absorb a laser beam and convert the laser beam to heat, wherein the ring-shaped component of the case includes a light transmissive material configured to partially transmit the laser beam for welding the first component and the second component together around at least a part of the base surface of the groove, wherein the first contact portion of the fourth surface of the first component and the first end portion of the first side wall portion of the second component are located at a first portion of the base surface of the groove, the second contact portion of the fourth surface of the first component and the second end portion of the second side wall portion of the second component are located at a second portion of the base surface of the groove, the third contact portion of the fourth surface of the first component and the third end portion of the third side wall portion of the second component are located at a third portion of the base surface of the groove, and the fourth contact portion of the fourth surface of the first component and the fourth end portion of the fourth side wall portion of the second component are located at a fourth portion of the base surface of the groove.

2. The vehicular camera according to claim 1, comprising:
a sealing material disposed between the first component of the case and the lens barrel.

3. The vehicular camera according to claim 1, wherein the first component of the case and the lens barrel are attached around an optical axis of the lens barrel.

4. The vehicular camera according to claim 1, wherein the sensor board and the lens barrel are fixed to each other by a fixing unit at two or more places.

5. The vehicular camera according to claim 4, wherein the fixing unit includes at least one of an adhesive, a screw, or solder.

6. The vehicular camera according to claim 1, wherein a transmittance of the light absorptive material with respect to the laser beam is less than 10%, and a transmittance of the light transmissive material with respect to the laser beam is 20% or more.

* * * * *